United States Patent [19]
Arnold

[11] Patent Number: 5,526,428
[45] Date of Patent: Jun. 11, 1996

[54] ACCESS CONTROL APPARATUS AND METHOD

[75] Inventor: Todd W. Arnold, Charlotte, N.C.

[73] Assignee: International Business Machines Corporation, Armonk, N.Y.

[21] Appl. No.: 175,032

[22] Filed: Dec. 29, 1993

[51] Int. Cl.⁶ .................................................. H04L 9/00
[52] U.S. Cl. ................................ 380/25; 380/21; 380/24; 340/825.31
[58] Field of Search ............................... 380/21, 23–25; 340/825.31–825.34

[56] References Cited

U.S. PATENT DOCUMENTS

| | | | |
|---|---|---|---|
| 4,095,739 | 6/1978 | Fox et al. | 235/382 |
| 4,238,853 | 12/1980 | Ehrsam et al. | 380/49 |
| 4,802,218 | 1/1989 | Wright et al. | 380/23 |
| 4,816,653 | 3/1989 | Anderl et al. | 235/380 |
| 4,837,422 | 6/1989 | Dethloff et al. | 235/380 |
| 4,864,614 | 9/1989 | Crowther | 380/21 |
| 4,897,874 | 1/1990 | Lidnsky et al. | 380/25 |
| 4,900,903 | 2/1990 | Wright et al. | 235/380 |
| 5,010,237 | 4/1991 | Kawana | 235/379 |
| 5,048,085 | 9/1991 | Abraham et al. | 380/23 |
| 5,055,658 | 10/1991 | Cockburn | 235/382 |
| 5,150,409 | 9/1992 | Elsner | 380/23 |

*Primary Examiner*—Salvatore Cangialosi
*Attorney, Agent, or Firm*—A. P. Tennent

[57] ABSTRACT

An improved access control apparatus, method, and system are disclosed to enhance the security of information in cards of the type having data storage and functions which are not accessible without verification of the identity and the authority of a person requesting access. The card need not include identification information for others that may require access to information in a person's card. Several authorization profiles are provided in a card, but there is no need that a profile be identified to any one person in order that they each may perform required tasks using or adding information in another person's card. The identification card of a supervisor or doctor who requires access to another person's card contains secret information Xsup identifying the supervisor or doctor as having the authority of supervisor or physician and an encryption key. The secret authorization information is encrypted and transmitted through the reader to the other person's card where it is decrypted and compared with the X'sup secret value stored in the other person's card. If they agree, the supervisor is permitted to perform functions authorized to be performed by supervisors in accordance with the profile for supervisors in the other person's card. Each supervisor is identified by a supervisor's own card using a password, PIN, or biometrics that may be changed as often as desired without recalling the cards of others for update. The authorization information is not exposed outside of a secure environment. Therefore, unlike PINs which are exposed during entry, it need not be changed or updated during the life of the card.

24 Claims, 3 Drawing Sheets

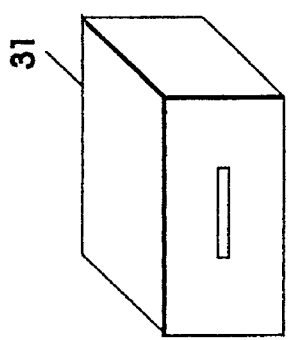
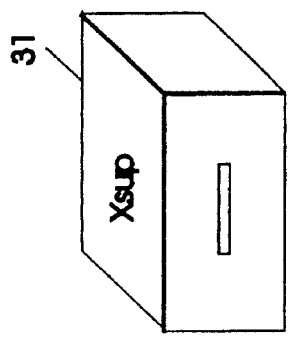
FIG. 3
ESTABLISH SESSION KEY KS1
eKS1 (Xsup)
FIG. 4
ESTABLISH SESSION KEY KS2
eKS2 (Xsup)
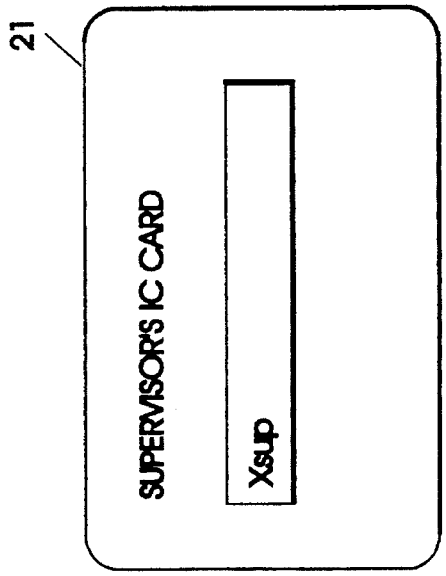
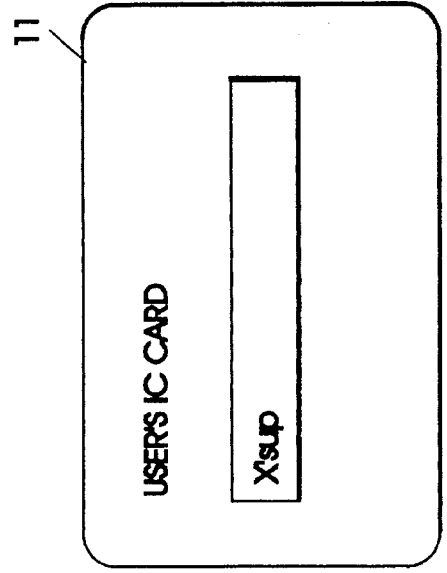

ACCESS CONTROL APPARATUS AND METHOD

BACKGROUND OF THE INVENTION

1. Technical Field

This invention relates to portable data carriers such as IC cards, chip cards and smart cards and more particularly to security systems for controlling the authority of persons to access and change information contained in such cards.

2. Description of the Prior Art

U.S. Pat. No. 4,816,653 (Anderl et al.) teaches a file system for an IC card. The system has multiple levels of authorization controlling access to commands and data and password data protection contained in the header of each file. This system responds to read and write requests from the related workstation to provide or record data if the password and authority of the person at the workstation indicates that the person has the authority to perform the requested function. The interface to the IC card itself is not well defended in that surreptitious monitoring of the interface in an altered or counterfeit workstation will expose the passwords and other information as they are being transferred. There is no handshaking between the workstation and the IC card to detect counterfeit cards or workstations.

U.S. Pat. No. 5,048,085 (Abraham et al.) teaches a system having handshaking and other means to detect counterfeits. In this system, the users authority resides in user profiles that determine the functions that each user can perform and when they can be performed. In this system, a profile can be downloaded from another authenticated device in order to improve system flexibility. These features and others are used to advantage in the instant invention and the teachings described in this patent are hereby incorporated by reference into the instant specification.

U.S. Pat. No. 4,802,218 and 4,900,903 (Wright et al.) teach automated transaction systems exemplified as a postal metering systems that accommodates user cards, and supervisor cards for identifying persons and rate cards and master cards for storing data. The microprocessor in the card and the microprocessor in the postage printing station perform a handshake function to authenticate the card and the postage printing station A more serious exposure of each of these prior art teachings is that the supervisors password is jeopardized when it requires wide distribution such as may be the case in a medical or social services application. For example, if all doctors who are to have access to information in the IC card must use the same password, there is a high likelihood that the password will become known to fraudulent persons who then are able to misuse the system.

U.S. Pat. No. 4,095,739 (Fox et al.) teaches a system for controlling access to a computer and a network of remote terminals. Users insert their ID card into a card reader at a remote terminal where the identification data is read and compared with data stored in a table of authorized users that is located either at the central computer or at each remote terminal. A supervisor who wishes to update the authorization table must insert a supervisor identification card containing supervisor identification data which is also compared with data stored in an authorization table.

U.S. Pat. No. 4,837,422 (Dethloff et al.) describes a multiple user card like that mentioned above where the authorized holder/user may further authorize subusers by entering subuser secret number identity verification data into the card. In this way the primary user need not divulge the primary secret number to anyone yet still allow another to use the card. Further limitations on extent and type of use are provided for. Again, since each subuser must be separately identified by the card, it becomes impossible to store in the card, all of the secret numbers that will be necessary for a health card for example to allow all of those health care workers who need access to a patients card data to have access without compromising the security of the card.

U.S. Pat. No. 5,010,237 (Kawana) teaches an IC card that stores a plurality of secret numbers which are compared with the numbers entered by authorized users. The comparison determines which functions are permitted during the transaction. For example comparison with a first PIN (secret number) allows the supervisor to read and write in the card but not to transmit. Comparison with the second PIN allows the manager to write and to transmit card data but not to read it.

U.S. Pat. No. 5,055,658 (Cockburn) teaches a security system wherein a master key in the form of a plastic memory card which allows the device being protected to be programmed to recognize similar slave keys and identification information such a thumb print in order to give the authorized slave key holder access to the device.

In this system like those described above, the comparison data for all users including supervisors must be stored in the devices to which access is being controlled. When those devices are computers or remote workstations, large amounts of memory are available but even then, only a limited number of supervisors are contemplated. When the device to be accessed is an IC card, it does not have adequate memory to store the data identifying each emergency room doctor that may need access to a patient's card in order to provide treatment.

As mentioned earlier, it is known to grant access to an IC card under an authorization profile by entering a secret number or PIN. When a large number of supervisors must access each card, the secret number must be shared by the supervisors which is not a secure arrangement. It is not practical to store each supervisor's PIN on each card because as new supervisors are added to the system or as a PIN is changed, all cards must be updated. In order that the PIN remain secure, each supervisor must enter the changed PIN into each card that has been issued. Not only will the supervisor be overwhelmed by the scale of the task but it will be impossible to get every cardholder to bring in their card to a specific person for update.

There is still another problem with sharing identity information among a number of supervisors. When biometric information such as thumb print, voice print, or signature dynamics are used to identify a supervisor, it can not by definition be shared by two or more persons. In summary, the needs not provided for in the prior art are that each supervisor must have their own PIN or biometric reference information, each supervisor must be able to update or change the information without recalling all cards that the supervisor may be required to access in the future, and security must be provided so that information captured while traveling through the system cannot compromise the security of other cards in the system.

SUMMARY OF THE INVENTION

These and other disadvantages of the prior art are overcome by the instant invention which provides for each person to hold a personal identification and information card that need not include identification information for others that may require access to information in a person's card. As in Abraham et al., several authorization profiles are provided but there is no need that a profile be identified to any one person. For example all doctors may use the same authorization profile and all hospital administrative staff use a different profile in order that they each may perform required tasks using or adding information in a patient's personal information card. Thus the authorization profile to be used with a card still resides, at least in part, in the card but the identity information of a supervisor user or doctor resides in the identification card of that supervisor or doctor.

The identification card of the supervisor or doctor also contains secret information Xsup identifying that person as having the authority of supervisor or physician and an encryption key. The supervisor's card establishes a secure session with the card reader, for example as described in Abraham, and then encrypts the Xsup information and sends it to the reader where it is decrypted using the session key and saved for use with the card of another person. The supervisors card is then removed from the reader and the other persons card is inserted for verification of the identity of the other person by PIN or biometric information. This other persons card and the reader now establish a new session creating a new session key which will be different from the previous session key. The reader then encrypts the Xsup information using the new session key and transmits it to the other persons card where it is decrypted and compared with the Xsup secret value stored in the other persons card. If they agree, the supervisor now is logged onto the other persons card for the performance of functions authorized to be performed by supervisors in accordance with the profile for supervisors in the other persons card.

Accordingly it is an advantage of the instant invention that each supervisor is identified by a supervisors own card using a password, PIN, or biometrics that may be changed as often as desired without recalling the cards of others for update.

It is a still further advantage that the encryption keys and the authorization values such as Xsup are not exposed outside of a secure environment. They unlike PINs which are exposed during entry, need not be changed or updated during the life of the card.

BRIEF DESCRIPTION OF THE DRAWINGS:

FIG. 3 shows a flow of information between a card reader and a users card.

FIG. 4 shows a flow of information between a card reader and a supervisors card.

Figure 1:
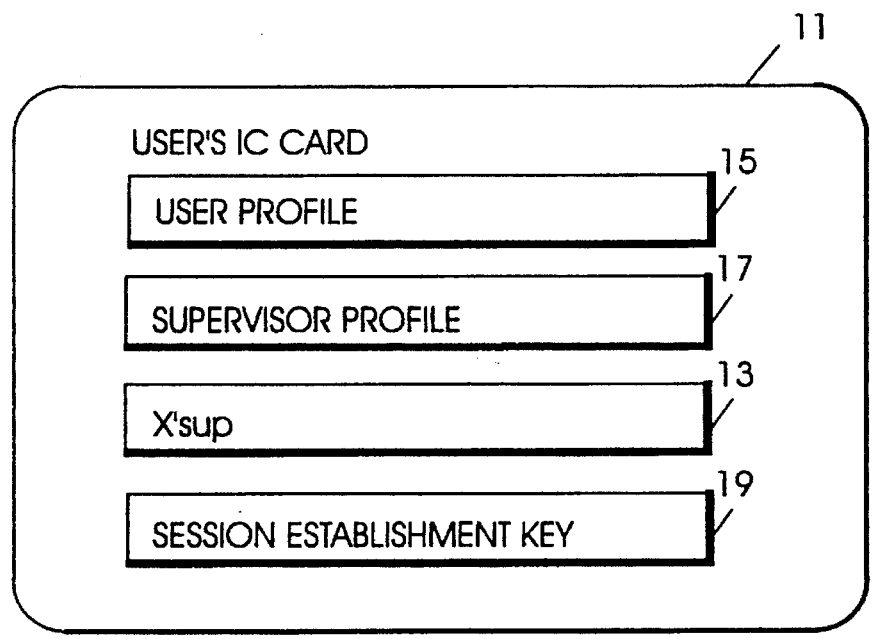
FIG. 1 shows information in an IC card of a typical user including a field according to the invention.

DESCRIPTION OF A PREFERRED EMBODIMENT:

FIG. 1 shows block diagram storage fields for part of the information stored in an IC card 11 of a typical user including the field X'sup 13 containing information used in this embodiment of the invention. The user profile 15 defines those functions that the user can perform using the user card. Examples are to debit an account if it is a debit card, or to purchase drugs if it is a health identification card. The supervisor's profile 17 defines those functions that a supervisor can perform to information in the user's IC card 11. Examples are to reset the PIN if the user has inadvertently provided the wrong secret number to the card more than a fixed number of times. Another example is to enter prescription drug information into a health card for access by a pharmacist and perhaps for access by the user in order that user may buy the controlled drug and be able to take the drug correctly. The X'sup field 13 contains information that is used by the card to determine whether the alleged supervisor or doctor really is a supervisor or doctor. The session establishment key 19 is an encryption key that is used by all devices in the system to establish sessions and a session key for each session between any two devices in the system. For example a session will be established between the users IC card and the reader.

Figure 2:
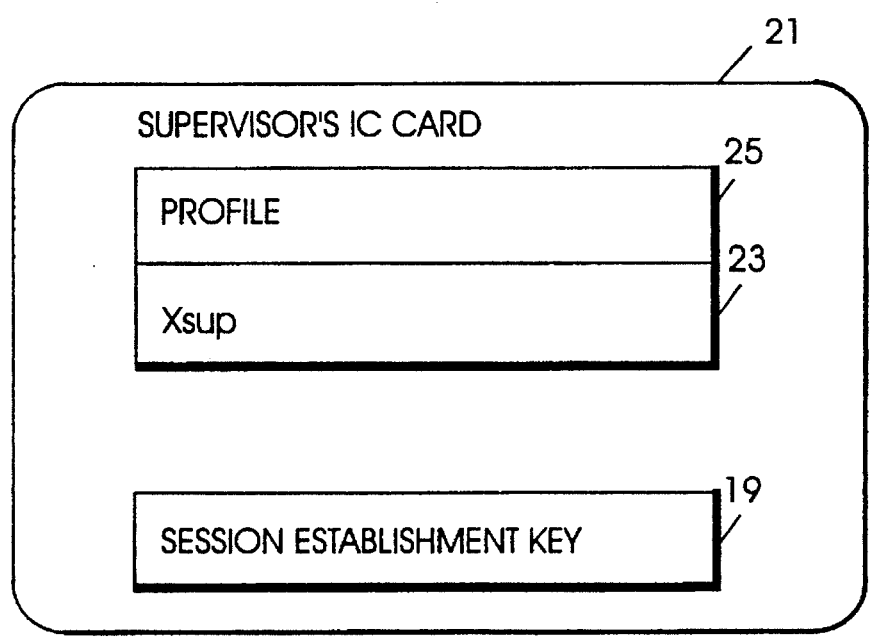
FIG. 2 shows information in an IC card of a typical supervisor including a field according to the invention

FIG. 2 shows part of the information stored in the IC card 21 of a typical supervisor. The profile 25 defines those functions that the supervisor can perform using the supervisors card. An example is to change the PIN number of the supervisor. The Xsup field 23 contains information that is used by the card in accord with the invention to assert that the supervisor or doctor really is a supervisor or doctor. The session establishment key 19 is an encryption key that is used by all devices in the system to establish sessions and a session key for each session between any two devices in the system. The session establishment key in the supervisors card is the same as the session establishment key in the users card. Likewise X'sup and Xsup are the same or related values. The encryption keys and the authorization values such as Xsup are not exposed outside of a secure environment of an IC card or a card reader. For this reason, they need not be changed or updated during the life of the card.

FIG. 3 shows the supervisor's card 21 and the card reader 31 and depicts the information flow necessary to establish a secure communication session and to transfer the value Xsup to the card reader 31. The session key is established for example in accord with the teachings of U.S. Pat. No. 4,238,853 (Ehrsam et al.) of common assignment with this application. The teachings of U.S. Pat. No. 4,238,853 are hereby incorporated by reference. After the session key has been established, the IC card 21 encrypts the value Xsup under the session key KS1 which is depicted in the legend eKS1(Xsup) and is then sent to the reader 31 where it is decrypted and stored in a secure area for later use by the users card as the trial authorization value. An example secure area is shown in U.S. Pat. No. 5,027,397 (Double et al) which patent is incorporated herein by reference.

FIG. 4 shows the user's card 11 and the card reader 31 and depicts the information flow necessary to establish a secure communication session and to transfer the value Xsup from the card reader 31. The session key is established in the same way as was done with the supervisors card but of course results in a new key value KS2. After the session key KS2 has been established, the card reader 31 encrypts the value Xsup under the session key KS2 which encryption is depicted in the legend eKS2(Xsup) and this encrypted value of Xsup is then sent to the users card 11. At the user's card 11 it is decrypted and used as a trial authorization value for comparison with the test authorization value X'sup stored in the user's card 11.

Figure 5:
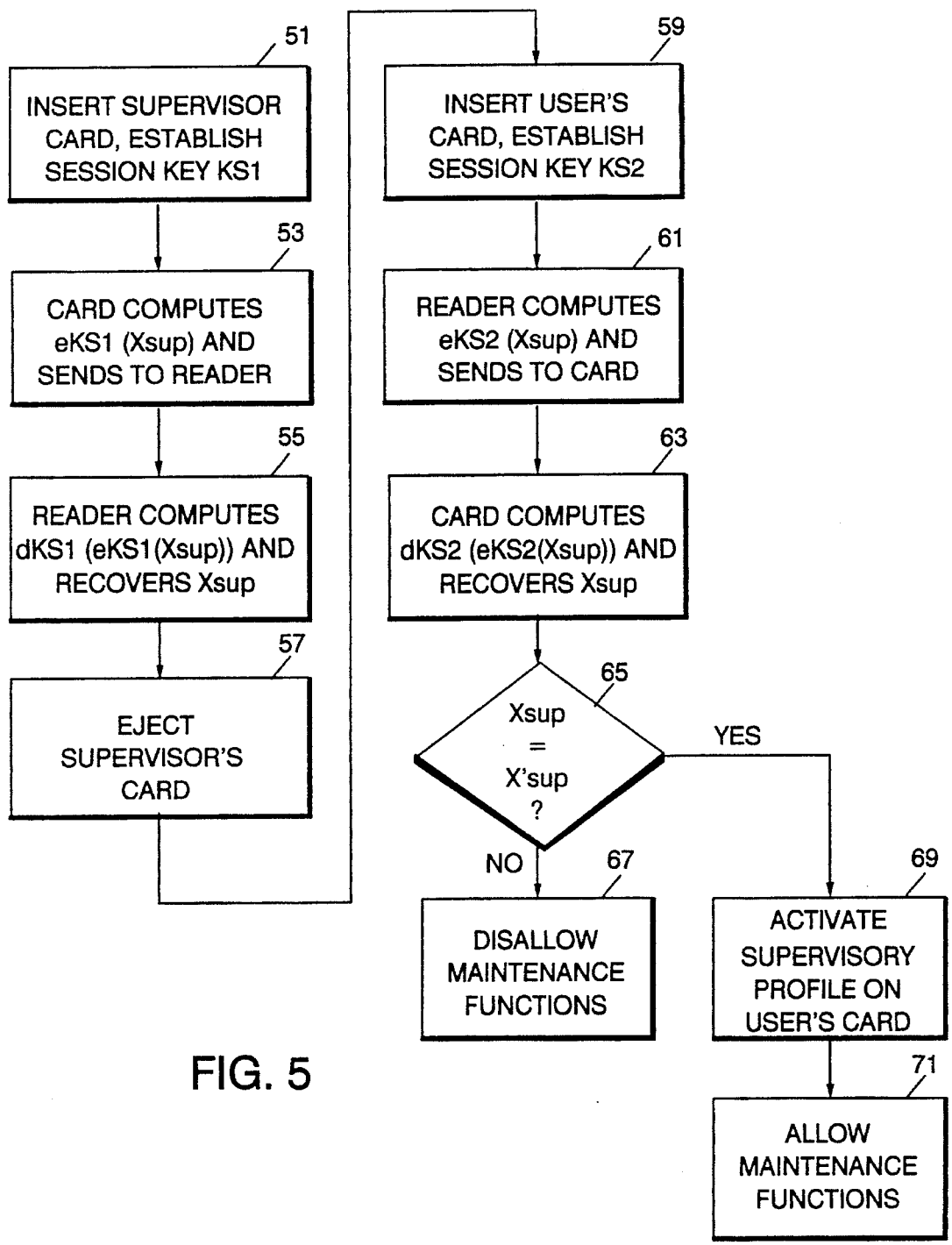
FIG. 5 is a flow diagram of the steps involved in authorizing a supervisor to perform a maintenance function on a users card.

FIG. 5 shows the steps necessary for a users card to be able to determine whether a supervisor or doctor is authorized to access or change information or perform functions (change PIN, load keys, define data areas, etc.) in the user's card. At block 51, the supervisor will insert the supervisors card 11 into the card reader 13 where as previously described, a session key KS1 will be established between the computers in the IC card and the card reader. At block 53 the computer in the supervisors IC card computes the value of the encryption of the authorization value Xsup under the session key KS1 and sends this value eKS1(Xsup) to the card reader 13. At block 55, the computer of the card reader computes the value of the decryption of the value eKS1(Xsup) under the same session key KS1. This value is depicted as dKS1(eKS1(Xsup) ) in block 55. Any access such as by line tapping will not allow capture of the authorization value Xsup, because the line tapper will not have the session key KS1. The card reader 31 now has the authorization value Xsup which is stored securely as previously described and the supervisor's card 21 is removed from the reader 31 at block 57 to make way for the card of the user to which access is desired by the supervisor.

Block 59 in FIG. 5 shows the step of inserting the user's IC card 11 into the card reader 31 where as previously described, a session key KS2 is established between the computers in the IC card and the card reader. At block 61 the computer in the card reader computes the value of the encryption of the authorization value Xsup under the session key KS2 and sends this value eKS2(Xsup) to the user's card 11. At block 63, the computer of the user's card 11 computes the value of the decryption of the value eKS2(Xsup) under the same session key KS2. This value is depicted as dKS2(eKS2(Xsup)) in block 63. Again any access such as by line tapping will not allow capture of the authorization value Xsup, because the line tapper will not have the session key KS2. The user's card now has the trial authorization value Xsup which is compared in block 65 with the test authorization value X'sup. If the authorization values compare unequal, the user's card has determined that the supervisor either is not an authorized supervisor or there has been an error or tampering in the system which caused the compare unequal. The user's card then does not allow access to it's information as shown by block 67.

In this embodiment, an equal comparison is considered to be a positive authorization. It will be appreciated that other comparisons such as the trial value being one more than the test value or the trial value being twice the test value can be used without departing from the spirit and scope of the invention so long as the positive comparison is predictable by the user's card.

If the authorization values compare equal at block 65, the user's card has determined that the supervisor is an authorized supervisor. The user's card then activates the supervisor profile at block 69 to determine which functions a supervisor is authorized to perform and what data the supervisor is authorized to access in the user's IC card. The user's card 11 then allows access to its information and functions as shown by block 71 to for example allow the supervisor to perform maintenance functions such as updating credit limits or resetting the user's secret PIN etc. Activation of the supervisor's profile is done in accord with the teachings of U.S. Pat. No. 5,048,085 which is incorporated herein by reference.

Having described the invention with reference to the preferred embodiment thereof in the form of IC cards and readers, it will be apparent to those skilled in the art of computers systems that the principles of the invention may be applied in other environments to determine the authorization of putative users without requiring that the protected elements store the identity information for all possible putative users.

What is claimed is:

1. An information element comprising:

means for storing a test authorization value, said test authorization value being related for all persons having the same authority;

means for comparing said test authorization value with a trial authorization value received from an element interface;

means for allowing access to information in said information element only if said test authorization value compares positively with said trial authorization value.

2. The information element of claim 1 wherein said authorization value is a numerical value.

3. The information element of claim 1 wherein said information element is an IC card.

4. The information element of claim 3 wherein said element interface is an IC card reader.

5. The information element of claim 1 wherein said access to information is the performance of a function upon such information.

6. The information element of claim 5 wherein said function is the setting of control information in said information element.

7. The information element of claim 6 wherein said control information in said information element is a personal identification number.

8. The information element of claim 6 wherein said control information in said information element is a maximum value limit.

9. The information element of claim 1 wherein said information in said information element is medication information.

10. The information element of claim 1 wherein said information element is a personal identification card.

11. An element interface comprising:

means for receiving an identification element in communicating relationship with said interface;

means for receiving from said identification element, a trial authorization value, said trial authorization value being the same for all persons having similar identification elements and the same authority;

means for sending said trial authorization value to an information element, means for instructing said information element to perform a function in said information element, said function being performed only upon the positive correlation of said trial authorization value and a test authorization value stored in said information element.

12. The element interface of claim 11 further comprising:

means for storing said trial authorization value;

means for removing said identification element and for receiving said information element in its place.

13. The element interface of claim 12 wherein said identification element and said information element are IC cards and said element interface is an IC card reader.

14. The element interface of claim 12 further comprising means for receiving from a person, a personal identification verification value to verify the identity of a person holding said identification element.

15. The element interface of claim 14 wherein said element interface includes a computer having a keyboard, and said means for receiving said personal identification verification value is said keyboard.

16. An identification element comprising:

means preprogrammed into said identification element for storing a trial authorization value;

means for sending said trial authorization value from said identification element to an element interface, said trial authorization value being the same for all persons having similar identification elements and the same authority.

17. The identification element of claim 16 wherein said trial authorization value is a numerical value.

18. The identification element of claim 16 wherein said identification element is an IC card.

19. The identification element of claim 18 wherein said element interface is an IC card reader.

20. The identification element of claim 16 further comprising means for storing information relevant to an authorized holder of said element.

21. The identification element of claim 20 wherein said information relevant to an authorized holder of said element is medical information.

22. The information element of claim 16 wherein said identification element is a personal identification card.

23. The method of granting access to information in an information element comprising the steps of:

inserting an identification element into an element reader;

establishing a session key KS1 between a computer in said identification element and a computer controlling said reader;

computing in said identification element, a value eKS1(Xsup) of the encryption of an authorization value Xsup under said session key KS1;

sending said value eKS1(Xsup) to said computer controlling said reader;

computing in said computer controlling said reader, a value dKS1(eKS1(Xsup)) of the decryption of said value eKS1(Xsup) under said session key KS1;

removing said identification element from said reader to make way for said information element;

inserting said information element into said reader;

establishing a session, key KS2 between a computer in said information element and said computer controlling said reader;

computing in said computer controlling said reader, the value eKS2(dKS1(eKS1(Xsup))) of the encryption of the authorization value dKS1(eKS1(Xsup)) under the session key KS2;

sending said value eKS2(dKS1(eKS1(Xsup))) to said information element;

computing in said information element, the value dKS2(eKS2(dKS1(eKS1(Xsup)))) of the decryption of said value eKS2(dKS1(eKS1(Xsup))) under said session key KS2;

comparing in said computer in said information element, said value dKS2(eKS2(dKS1(eKS1(Xsup)))) with a test authorization value X'sup;

allowing execution of commands in said information element if said value dKS2(eKS2(dKS1(eKS1(Xsup)))) compares positively with said test authorization value X'sup.

24. The method of claim 23 wherein said step of allowing execution further comprises the step allowing access to information in said information element.

* * * * *